//<br>US 011506435B2

(12) United States Patent
Ohura et al.

(10) Patent No.: US 11,506,435 B2
(45) Date of Patent: Nov. 22, 2022

(54) WATER REGULATOR

(71) Applicant: DAIKIN INDUSTRIES, LTD., Osaka (JP)

(72) Inventors: Ryuuta Ohura, Osaka (JP); Takuya Kotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/570,637

(22) Filed: Jan. 7, 2022

(65) Prior Publication Data

US 2022/0128285 A1 Apr. 28, 2022

Related U.S. Application Data

(63) Continuation of application No. PCT/JP2020/026076, filed on Jul. 2, 2020.

(30) Foreign Application Priority Data

Jul. 9, 2019 (JP) .............................. JP2019-127955

(51) Int. Cl.
*F25B 49/02* (2006.01)

(52) U.S. Cl.
CPC ........ *F25B 49/02* (2013.01); *F25B 2313/004* (2013.01); *F25B 2339/047* (2013.01); (Continued)

(58) Field of Classification Search
CPC .............. F25B 49/02; F25B 2313/004; F25B 2339/047; F25B 2600/2515; F25B 2700/2103

See application file for complete search history.

(56) References Cited

U.S. PATENT DOCUMENTS

| 4,150,788 A | 4/1979 | Matsumoto et al. |
| 4,821,580 A * | 4/1989 | Jorritsma ................ G01F 1/363 |
| | | 702/47 |

(Continued)

FOREIGN PATENT DOCUMENTS

| JP | 53-90641 A | 8/1978 |
| JP | 5-280819 A | 10/1993 |

(Continued)

OTHER PUBLICATIONS

International Preliminary Report on Patentability and English translation of the Written Opinion of the International Searching Authority for International Application No. PCT/JP2020/026076, dated Jan. 20, 2022.

(Continued)

*Primary Examiner* — Henry T Crenshaw
(74) *Attorney, Agent, or Firm* — Birch, Stewart, Kolasch & Birch, LLP

(57) ABSTRACT

A water regulator includes a water regulation valve, a first temperature sensor, a second temperature sensor, and a controller. The water regulation valve regulates a quantity of water flowing through water pipes. The first temperature sensor measures a temperature of one of the water pipes which is connected to an inlet of a heat exchanger. The second temperature sensor measures a temperature of one of the water pipes which is connected to an outlet of the heat exchanger. The controller controls an opening degree of the water regulation valve, based on a difference between the temperature measured by the first temperature sensor and the temperature measured by the second temperature sensor.

16 Claims, 3 Drawing Sheets

(52) U.S. Cl.
CPC ............. *F25B 2600/2515* (2013.01); *F25B 2700/2103* (2013.01)

(56) References Cited

U.S. PATENT DOCUMENTS

| | | | | |
|---|---|---|---|---|
| 5,070,704 | A * | 12/1991 | Conry | F24F 3/08 62/201 |
| 2005/0022542 | A1* | 2/2005 | Sakakibara | F24D 19/1054 62/238.7 |
| 2009/0151388 | A1* | 6/2009 | Platt | F25B 29/003 62/498 |
| 2011/0289952 | A1* | 12/2011 | Kim | F24H 9/0005 62/189 |
| 2013/0174601 | A1* | 7/2013 | Matsuo | F25B 49/02 62/498 |
| 2014/0260388 | A1* | 9/2014 | Umeda | F25B 49/022 62/208 |
| 2017/0276417 | A1* | 9/2017 | Noll | F25B 31/00 |
| 2017/0363337 | A1* | 12/2017 | Swofford | F25B 39/00 |
| 2018/0372362 | A1* | 12/2018 | Turney | F24F 11/47 |
| 2020/0141615 | A1* | 5/2020 | Kniffler | F25B 30/06 |

FOREIGN PATENT DOCUMENTS

| | | |
|---|---|---|
| JP | 2001-235182 A | 8/2001 |
| JP | 2008-75948 A | 4/2008 |
| JP | 2019-20090 A | 2/2019 |
| WO | WO 2015/114839 A1 | 8/2015 |

OTHER PUBLICATIONS

International Search Report (PCT/ISA/210) issued in PCT/JP2020/026076, dated Sep. 24, 2020.
Extended European Search Report for European Application No. 20837122.9, dated Jul. 22, 2022.

* cited by examiner

WATER REGULATOR

CROSS REFERENCE TO RELATED APPLICATIONS

This application is a Continuation of PCI international Application No. PCT/JP2020/026076, filed on Jul. 2, 2020, which claims priority under 35 U.S.C. 119(a) to Patent Application No. 2019-127955, filed in Japan on Jul. 9, 2019, all of which are hereby expressly incorporated by reference into the present application.

TECHNICAL FIELD

Embodiments disclosed herein relate to a water regulator in a refrigeration cycle apparatus.

BACKGROUND ART

As for air conditioning apparatuses for conditioning indoor air with a refrigerant, an air conditioning apparatus of a water cooling type has been known, which is configured to cool or heat a heat source-side heat exchanger with water. Patent Literature 1 (JP 2008-075948 A) discloses an air conditioning apparatus of a water cooling type configured to regulate a flow rate of cooling water to be supplied, in order to optimize a high pressure at a refrigerant circuit.

SUMMARY

This disclosure provides a water regulator for controlling a quantity of water flowing through water pipes in a refrigeration cycle apparatus. The refrigeration cycle apparatus includes a refrigerant circuit through which a refrigerant flows, a circulation pump having a number of rotations controlled such that a difference between a pressure at an inlet of the circulation pump and a pressure at an outlet of the circulation pump falls within a predetermined range, the circulation pump being configured to circulate the water in the water pipes, and a heat exchanger configured to cause the refrigerant flowing through the refrigerant circuit to exchange heat with the water flowing through the water pipes. The water regulator includes: a water regulation valve configured to regulate the quantity of the water flowing through the water pipes; a first temperature sensor configured to measure a temperature of one of the water pipes which is connected to an inlet of the heat exchanger; a second temperature sensor configured to measure a temperature of one of the water pipes which is connected to an outlet of the heat exchanger; and a controller configured to control an opening degree of the water regulation valve, based on a difference between the temperature measured by the first temperature sensor and the temperature measured by the second temperature sensor.

DESCRIPTION OF EMBODIMENTS

First Embodiment (1) Configuration of Refrigeration Cycle Apparatus 1

Figure 1:
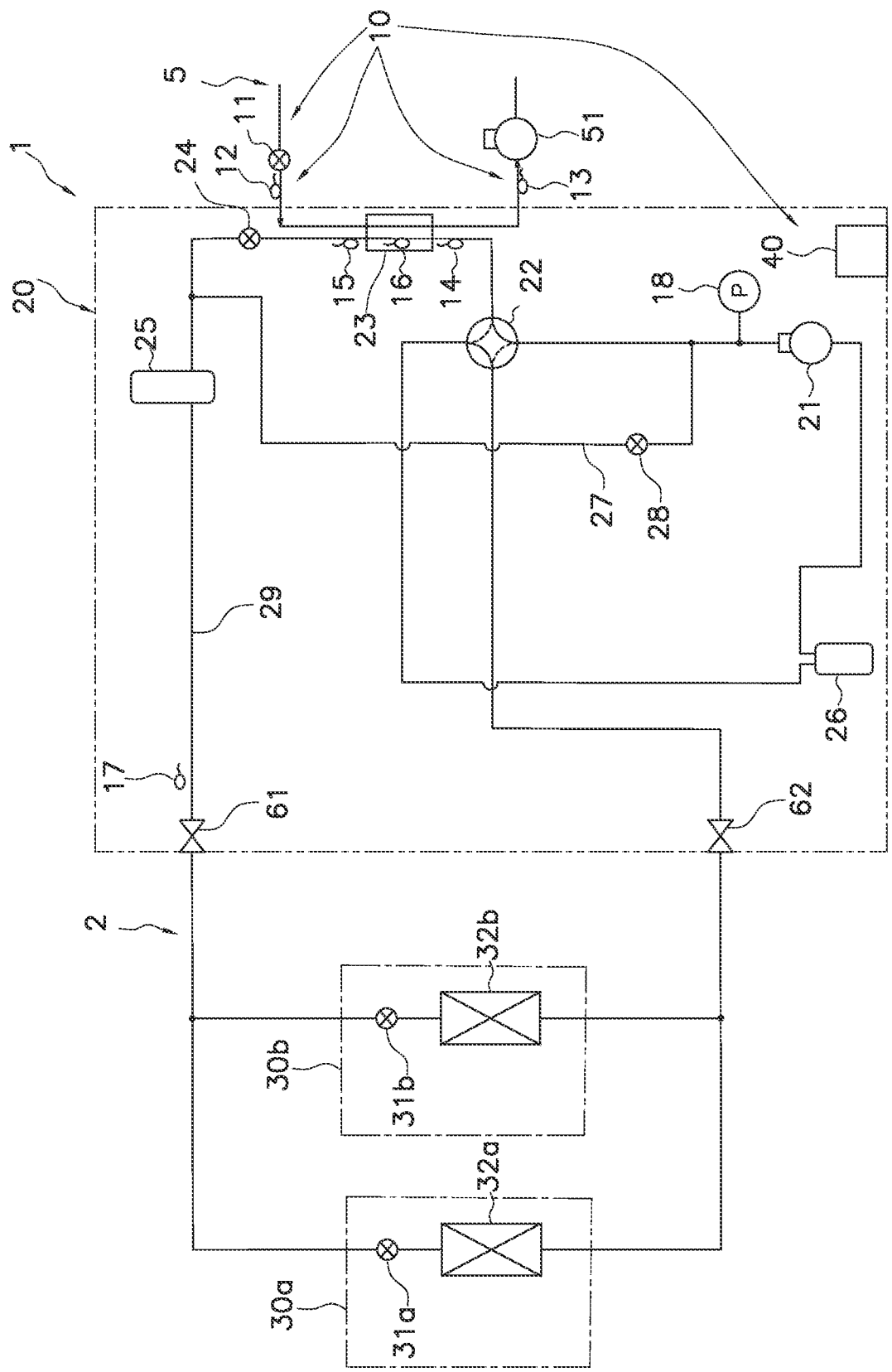
FIG. 1 is a diagram of a general configuration of a refrigeration cycle apparatus 1 including a water regulator 10 and a refrigerant circuit.

FIG. 1 schematically illustrates a general configuration of a refrigeration cycle apparatus 1 according to a first embodiment. FIG. 1 mainly illustrates a refrigerant circuit 2. The refrigeration cycle apparatus 1 is applicable to an air conditioning apparatus configured to perform a cooling operation and a heating operation, a water cooler-heater, and the like. The refrigeration cycle apparatus 1 is of a water cooling type. A refrigerant flows through the refrigerant circuit 2. A heat source-side heat exchanger 23 causes the refrigerant to exchange heat with water flowing through a water circuit 5.

The refrigeration cycle apparatus 1 according to the first embodiment includes a heat source unit 20, utilization units 30a and 30b, and a controller 40. The refrigeration cycle apparatus 1 includes one or more utilization units. The refrigeration cycle apparatus 1 illustrated in FIG. 1 includes two utilization units 30a and 30b.

The heat source unit 20 includes a compressor 21, an accumulator 26, a four-way switching valve 22, the heat source-side heat exchanger 23, a second electric valve 24, a high-pressure receiver 25, a bypass circuit 27, a third electric valve 28, a plurality of temperature sensors 12 to 17, a pressure sensor 18, a liquid-side shutoff valve 61, and a gas-side shutoff valve 62. In the heat source unit 20, the four-way switching valve 22, the heat source-side heat exchanger 23, the second electric valve 24, the high-pressure receiver 25, and the liquid-side shutoff valve 61 are connected in this order with refrigerant pipes. The refrigerant pipe connecting the second electric valve 24 and the liquid-side shutoff valve 61 is referred to as a liquid pipe 29.

The compressor 21 is configured to compress a refrigerant. The four-way switching valve 22 is configured to switch between a flow of the refrigerant in performing the heating operation (see a broken line in FIG. 1) and a flow of the refrigerant in performing the cooling operation (see a solid line in FIG. 1). The heat source-side heat exchanger 23 is configured to cause the refrigerant flowing through the refrigerant circuit 2 to exchange heat with the water flowing through the water circuit 5. The heat source-side heat exchanger 23 is of a plate type. The second electric valve 24 is configured to adjust a flow rate of the refrigerant flowing through the refrigerant pipes. Each of the high-pressure receiver 25 and the accumulator 26 is configured to temporarily store the refrigerant.

The pressure sensor 18 is connected to a discharge side of the compressor 21 and is configured to measure a high pressure. The temperature sensor 14 is disposed on the refrigerant pipe connecting the heat source-side heat exchanger 23 and the four-way switching valve 22, and is configured to measure a temperature of the refrigerant pipe connected to an inlet side of the heat source-side heat exchanger 23. The temperature sensor 15 is disposed on the refrigerant pipe connecting the heat source-side heat exchanger 23 and the second electric valve 24, and is configured to measure a temperature of the refrigerant pipe connected to an outlet side of the heat source-side heat exchanger 23. The temperature sensor 16 is disposed on the heat source-side heat exchanger 23 and is configured to measure a temperature of the refrigerant in a gas-liquid two-phase state. The temperature sensor 17 is disposed on the liquid pipe 29 and is configured to measure a temperature of the refrigerant pipe (i.e., the liquid pipe 29).

The bypass circuit 27 connects the refrigerant pipe on the discharge side of the compressor 21 to the refrigerant pipe (the liquid pipe 29) between the second electric valve 24 and the high-pressure receiver 25. The third electric valve 28 (a bypass electric valve) is disposed on the bypass circuit 27. The third electric valve 28 has an opening degree that is changeable in a sequential or stepwise manner from a closed state to a fully open state. Changing the opening degree of the third electric valve 28 changes the flow rate of the refrigerant flowing through the bypass circuit 27. During the cooling operation (in which a utilization-side heat exchanger serves as an evaporator), when the pressure in the liquid pipe 29 decreases, the bypass circuit 27 supplies the high-pressure refrigerant on the discharge side of the compressor 21 to the liquid pipe 29 to maintain the pressure in the liquid pipe 29. The bypass circuit 27 is connected to the refrigerant pipe on the discharge side of the compressor 21 and the refrigerant pipe between the second electric valve 24 and the high-pressure receiver 25. The connection of the bypass circuit 27 is not limited as long as the bypass circuit 27 is connected to the refrigerant pipe between the second electric valve 24 and the liquid-side shutoff valve 61 for the utilization units 30a and 30b. In addition, the connection of the bypass circuit 27 is not limited as long as the bypass circuit 27 supplies the high-pressure refrigerant discharged from the compressor 21 to any point between the second electric valve 24 and first electric valves 31a and 31b (to be described later).

The utilization unit 30a includes the utilization-side heat exchanger 32a and the first electric valve 31a. The utilization unit 30b includes the utilization-side heat exchanger 32b and the first electric valve 31b. The first electric valves 31a and 31b are connected to the respective utilization-side heat exchangers 32a and 32b with refrigerant pipes. The first electric valves 31a and 31b are connected to the liquid-side shutoff valve 61 with refrigerant pipes. The utilization-side heat exchangers 32a and 32b are connected to the gas-side shutoff valve 62 with refrigerant pipes.

Each of the first electric valves 31a and 31b is configured to decompress the refrigerant and adjust a flow rate of the refrigerant. Each of the utilization-side heat exchangers 32a and 32b causes the refrigerant to heat exchange with indoor air.

The controller 40 is a computer. The controller 40 includes a processor and a memory. In the first embodiment, the controller 40 is disposed in the heat source unit 20. The controller 40 may alternatively be disposed at any position. The controller 40 may include a plurality of computers that are disposed separately at different positions and are configured to perform control in cooperation with one another. The controller 40 controls the components of the heat source unit 20, the components of the utilization unit 30a, and the components of the utilization unit 30b. The controller 40 is connected to the components of the heat source unit 20, the components of the utilization unit 30a, the components of the utilization unit 30b, and the temperature sensors 12 to 17. The controller 40 acquires information about an operating state of each component, a measurement value of each sensor, and the like, and controls each component, based on the information.

During the heating operation, the compressor 21 discharges the refrigerant, the refrigerant flows through the utilization-side heat exchangers 32a and 32b, the first electric valves 31a and 31b, the high-pressure receiver 25, the second electric valve 24, the heat source-side heat exchanger 23, and the accumulator 26, and the compressor 21 sucks in the refrigerant again. In other word, each of the utilization-side heat exchangers 32a and 32b functions as a condenser (a radiator), and the heat source-side heat exchanger 23 functions as an evaporator during the heating operation.

During the cooling operation, the compressor 21 discharges the refrigerant, the refrigerant flows through the heat source-side heat exchanger 23, the second electric valve 24, the high-pressure receiver 25, the first electric valves 31a and 31b, the utilization-side heat exchangers 32a and 32b, and the accumulator 26, and the compressor 21 sucks in the refrigerant again. In other words, the heat source-side heat exchanger 23 functions as a condenser (a radiator), and each of the utilization-side heat exchangers 32a and 32b functions as an evaporator during the cooling operation.

(2) Configuration of Water Circuit 5 and Configuration of Water Regulator 10

A water regulator 10 includes a water regulation valve 11, the first temperature sensor 12, the second temperature sensor 13, and the controller 40.

As described above, the heat source-side heat exchanger 23 causes the refrigerant in the refrigeration cycle apparatus 1 to exchange heat with the water circulating in the water circuit 5. In the water circuit 5, the heat source-side heat exchanger 23, the water regulation valve 11, a circulation pump 51, and a water heat source (not illustrated) are connected with water pipes. The first temperature sensor 12 and the second temperature sensor 13 are disposed on the respective water pipes. The first temperature sensor 12 is located outside the heat source unit 20 and is disposed on the water pipe connected to the inlet side of the heat source-side heat exchanger 23. The second temperature sensor 13 is located outside the heat source unit 20 and is disposed on the water pipe connected to the outlet side of the heat source-side heat exchanger 23. The positions of the first temperature sensor 12 and second temperature sensor 13 are not limited to those described above. For example, the first temperature sensor 12 may be located inside the heat source unit 20 and disposed on the water pipe connected to the inlet side of the heat source-side heat exchanger 23. The second temperature sensor 13 may be located inside the heat source unit 20 and disposed on the water pipe connected to the outlet side of the heat source-side heat exchanger 23.

The circulation pump 51 is configured to circulate the water in the water circuit 5. The circulation pump 51 has a number of rotations controlled such that a difference between a pressure at an inlet of the circulation pump 51 and a pressure at an outlet of the circulation pump 51 falls within a predetermined range. In the first embodiment, the number of rotations of the circulation pump 51 is controlled independently of the controller 40. As illustrated in FIG. 1, the circulation pump 51 is disposed in the water circuit 5 and is connected to the outlet side of the heat source-side heat exchanger 23. The circulation pump 51 may be disposed in the water circuit 5 and connected to the inlet side of the heat source-side heat exchanger 23. The circulation pump 51 may be located at any position as long as it is disposed in the water circuit 5.

The water regulation valve 11 is configured to regulate the quantity of the water flowing through the water circuit 5. The water regulation valve 11 is an opening degree-adjustable electric valve. The water regulation valve 11 is controlled by the controller 40. The quantity of the water in the water circuit 5 is basically determined in accordance with the number of rotations of the circulation pump 51. However, since the controller 40 is incapable of controlling the circulation pump 51, the water regulation valve 11 rather than the controller 40 controls the quantity of the water in the water circuit 5. The water regulation valve 11 changes the quantity of the water in the water circuit 5 to cause a difference between the pressure at the inlet of the circulation pump 51 and the pressure at the outlet of the circulation pump 51. The circulation pump 51 controls the quantity of the water circulating in the water circuit 5, based on the pressure difference. As illustrated in FIG. 1, the water regulation valve 11 is disposed in the water circuit 5 and is connected to the inlet side of the heat source-side heat exchanger 23. The water regulation valve 11 may be disposed in the water circuit 5 and connected to the outlet side of the heat source-side heat exchanger 23. The water regulation valve 11 may be located at any position as long as it is disposed in the water circuit 5.

The water heat source is, for example, a cooling tower for cooling the water flowing through the water circuit 5.

The first temperature sensor 12 is configured to measure a temperature of the water pipe connected to the inlet side of the heat source-side heat exchanger 23. The second temperature sensor 13 is configured to measure a temperature of the water pipe connected to the outlet side of the heat source-side heat exchanger 23. Each of the first temperature sensor 12 and the second temperature sensor 13 is a thermistor. The controller 40 receives a value of the temperature measured by the first temperature sensor 12 and a value of the temperature measured by the second temperature sensor 13.

In the refrigeration cycle apparatus 1, the controller 40 adjusts the opening degree of the water regulation valve 11, based on the values of temperatures measured by the first temperature sensor 12 and second temperature sensor 13, and other kinds of information.

(3) Opening Degree Control for Water Regulation Valve 11

Figure 2:
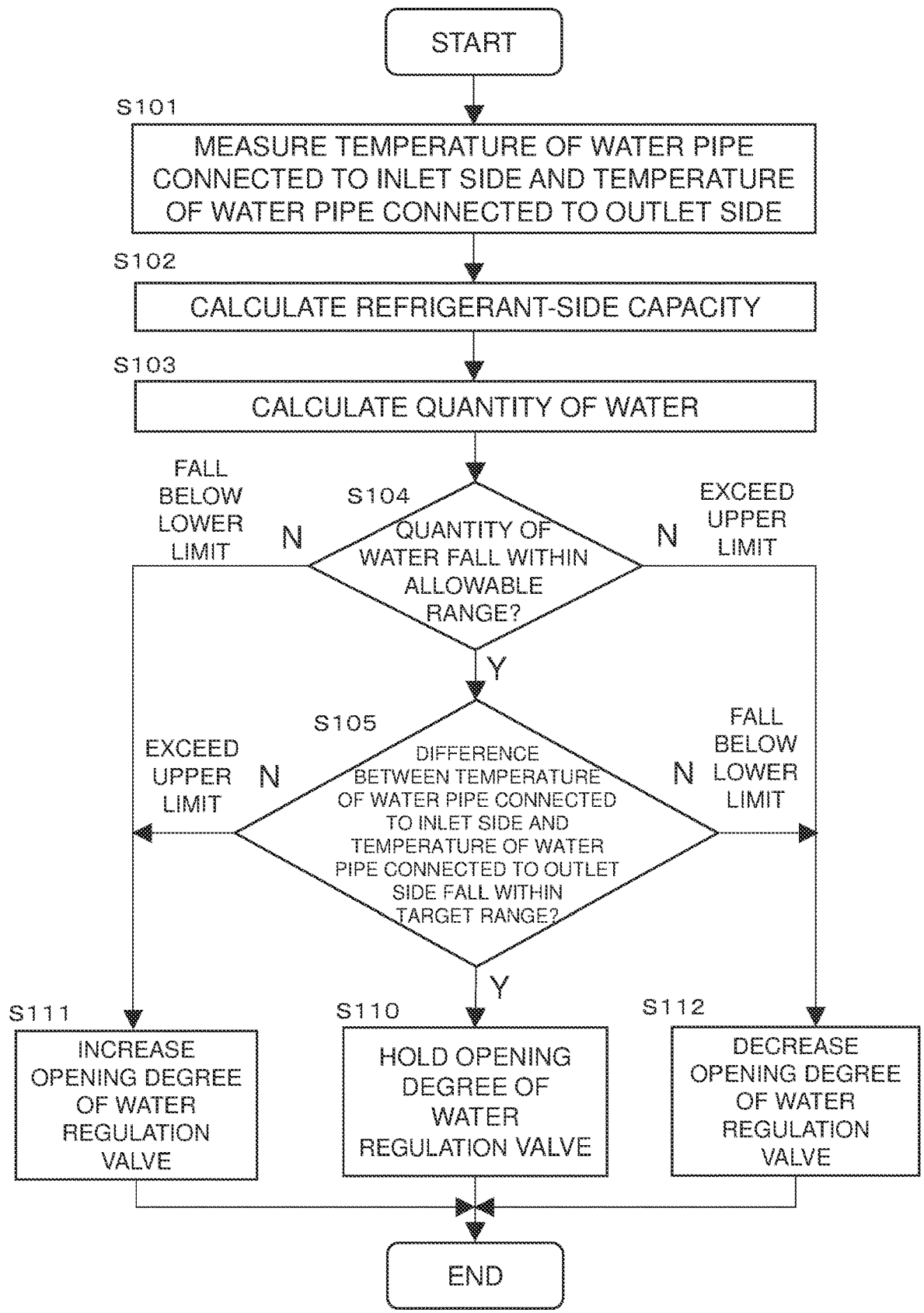
FIG. 2 is a flowchart of opening degree control for a water regulation valve 11.

With reference to FIG. 2, next, a description will be given of a flow of opening degree control for the water regulation valve 11.

It is assumed herein that an initial state refers to a state in which the refrigeration cycle apparatus 1 operates and the circulation pump 51 is driven to circulate the water in the water circuit 5. It is also assumed herein that the refrigeration cycle apparatus 1 carries out the cooling operation. In other words, the heat source-side heat exchanger 23 functions as a condenser. In this state, the controller 40 adjusts the opening degree of the water regulation valve 11.

In step S101, first, the first temperature sensor 12 measures a temperature of the water pipe connected to the inlet side of the heat source-side heat exchanger 23. The second temperature sensor 13 measures a temperature of the water pipe connected to the outlet side of the heat source-side heat exchanger 23. Each of the first temperature sensor 12 and the second temperature sensor 13 sends the measurement value to the controller 40.

In steps S102 and S103, next, the controller 40 calculates a quantity of the water passing the heat source-side heat exchanger 23 per unit time.

Figure 3:
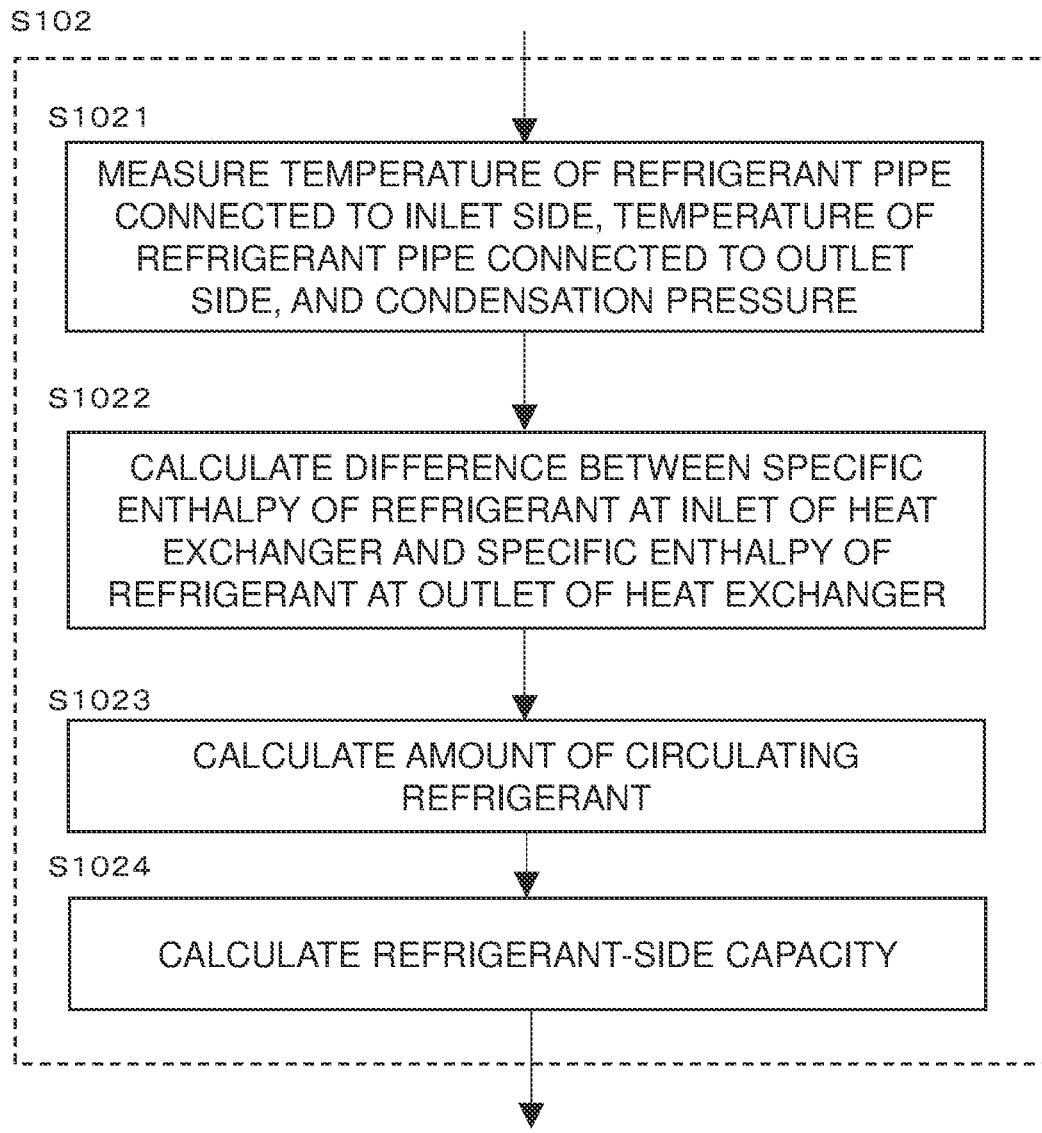
FIG. 3 is a flowchart of sub-steps of step S102 (refrigerant capacity calculation) in FIG. 2.

In step S102, the controller 40 calculates a refrigerant-side capacity of the refrigerant as a preparation for calculating the quantity of the water. The refrigerant-side capacity calculation in step S102 is then described in detail with reference to FIG. 3.

In the first embodiment, the controller 40 calculates a difference between the specific enthalpy of the refrigerant at the inlet of the heat source-side heat exchanger 23 and the specific enthalpy of the refrigerant at the outlet of the heat source-side heat exchanger 23 and the amount of the circulating refrigerant, in order to calculate the refrigerant-side capacity.

In steps S1021 and S1022, the controller 40 calculates the difference between the specific enthalpy of the refrigerant at the inlet of the heat source-side heat exchanger 23 and the specific enthalpy of the refrigerant at the outlet of the heat source-side heat exchanger 23. In step S1021, the temperature sensor 14 measures a temperature of the refrigerant pipe connected to the inlet side of the heat source-side heat exchanger 23, and the temperature sensor 15 measures a temperature of the refrigerant pipe connected to the outlet side of the heat source-side heat exchanger 23. The pressure sensor 18 measures a condensation pressure (a discharge pressure). Instead of directly measuring the condensation pressure, the temperature sensor 16 may measure a temperature of the refrigerant in a gas-liquid two-phase state in the heat source-side heat exchanger 23 (i.e., a condensation temperature) and estimate a condensation pressure from a physical property value of the refrigerant.

In step S1022, next, the controller 40 calculates the difference between the specific enthalpy of the refrigerant at the inlet of the heat source-side heat exchanger 23 and the specific enthalpy of the refrigerant at the outlet of the heat source-side heat exchanger 23, using the values measured in step S1021. A more specific description will be given below. First, the controller 40 calculates a specific enthalpy of the refrigerant at the inlet of the heat source-side heat exchanger 23, from a temperature of the refrigerant pipe connected to the inlet side of the heat source-side heat exchanger 23 and a condensation pressure, using a Mollier diagram for each refrigerant. Next, the controller 40 calculates a specific enthalpy of the refrigerant at the outlet of the heat source-side heat exchanger 23, from a temperature of the refrigerant pipe connected to the outlet side of the heat source-side heat exchanger 23 and the condensation pressure, using the Mollier diagram for each refrigerant. Next, the controller 40 calculates the difference between the specific enthalpy of the refrigerant at the inlet of the heat source-side heat exchanger 23 and the specific enthalpy of the refrigerant at the outlet of the heat source-side heat exchanger 23, from Equation (1).

$$\begin{aligned}&\text{(difference between the specific enthalpy of the}\\&\text{refrigerant at the inlet of heat exchanger and}\\&\text{the specific enthalpy of the refrigerant at the}\\&\text{outlet of heat exchanger }[kJ/kg])=\text{(specific}\\&\text{enthalpy of the refrigerant at inlet of heat}\\&\text{exchanger }[kJ/kg])-\text{(specific enthalpy of the}\\&\text{refrigerant at the outlet of heat exchanger }[kJ/\\&kg])\end{aligned} \quad (1)$$

In step S1023, next, the controller 40 estimates the amount of the circulating refrigerant. The controller 40 stores a regression formula prepared in advance for estimating the amount of the circulating refrigerant. The regression formula is prepared as follows. Parameter values are measured in such a manner that the cooling operation is carried out while operating conditions of the refrigeration cycle apparatus are changed. Parameters include a condensation pressure, an evaporation pressure, a suction temperature, and a number of rotations of a compressor. As for the condensation pressure and the evaporation pressure, a condensation temperature and an evaporation temperature may be used in a manner similar to that described above. The regression formula is prepared based on an amount of a circulating refrigerant that is actually measured while changing the parameters. In step S1023, the controller 40 substitutes the measured parameter values in the regression formula prepared in advance, thereby calculating the amount of the circulating refrigerant [kg/s].

In S1024, the controller 40 calculates a refrigerant-side capacity [kW] from Equation (2), using the difference between the specific enthalpy of the refrigerant at the inlet of the heat source-side heat exchanger 23 and the specific enthalpy of the refrigerant at the outlet of the heat source-side heat exchanger 23 [kJ/kg] (step S1022) and the amount of the circulating refrigerant [kg/s] (step S1023).

(refrigerant-side capacity [$kW$])=(amount of circulating refrigerant [$kg/s$])×(difference between the specific enthalpy of the refrigerant at the inlet of heat exchanger and the specific enthalpy of the refrigerant at the outlet of heat exchanger [$kJ/kg$])   (2)

Through the measurement and calculation described above, the controller 40 terminates the refrigerant-side capacity calculation in step S102.

Next, the controller 40 calculates the quantity of the water, using the measured value of the temperature of the water pipe connected to the inlet side of the heat source-side heat exchanger 23 (step S101), the measured value of the temperature of the water pipe connected to the outlet side of the heat source-side heat exchanger 23 (step S101), and the calculation result of the refrigerant-side capacity (step S102). First, the controller 40 calculates a specific heat of the water at the inlet of the heat source-side heat exchanger 23 [$kJ/(kg·K)$] and a density of the water at the inlet of the heat source-side heat exchanger 23 [$kg/m^3$] from the temperature of the water pipe connected to the inlet side of the heat source-side heat exchanger 23 (step S101), using a physical property value of the water. Likewise, the controller 40 calculates a specific heat of the water at the outlet of the heat source-side heat exchanger 23 [$kJ/(kg·K)$] and a density of the water at the outlet of the heat source-side heat exchanger 23 [$kg/m^3$] from the temperature of the water pipe connected to the outlet side of the heat source-side heat exchanger 23 (step S101), using the physical property value of the water. Next, the controller 40 calculates the quantity of the water [$m^3/s$] from Equation (3), using the temperature of the water pipe connected to the outlet side of the heat source-side heat exchanger 23 [° C.] (step S101), the temperature of the water pipe connected to the inlet side of the heat source-side heat exchanger 23 [° C.] (step S101), and the refrigerant-side capacity [$kW$] (step S102).

(quantity of water [$m^3/s$])=(refrigerant-side capacity [$kW$])/((specific heat of water at outlet of heat source-side heat exchanger [$kJ/(kg·K)$])×(density of water at outlet of heat source-side heat exchanger [$kg/m^3$])×(temperature of water pipe connected to outlet side of heat source-side heat exchanger [° C.])−(specific heat of water at inlet of heat source-side heat exchanger [$kJ/(kg·K)$])×(density of water at inlet of heat source-side heat exchanger [$kg/m^3$])−(temperature of water pipe connected to inlet side of heat source-side heat exchanger [° C.]))   (3)

In step S104, next, the controller 40 determines whether the current quantity of the water thus calculated falls within an allowable range. When the current quantity of the water falls within the allowable range, the control proceeds to step S105. When the current quantity of the water exceeds an upper limit of the allowable range, the control proceeds to step S112. In step S112, the controller 40 decreases the opening degree of the water regulation valve 11, and then terminates the control. When the current quantity of the water falls below a lower limit of the allowable range, the control proceeds to step S111. In step S111, the controller 40 increases the opening degree of the water regulation valve 11, and then terminates the control.

In step S105, the controller 40 determines whether the difference between the temperature of the water pipe connected to the inlet side of the heat source-side heat exchanger 23 and the temperature of the water pipe connected to the outlet side of the heat source-side heat exchanger 23 (step S101) falls within a target range. When the difference thus measured falls within the target range, the controller 40 maintains the opening degree of the water regulation valve 11 (S110), and then terminates the control. When the difference thus measured exceeds an upper limit of the target range, the controller 40 increases the opening degree of the water regulation valve 11 (S111), and then terminates the control. When the difference thus measured falls below a lower limit of the target range, the controller 40 decreases the opening degree of the water regulation valve 11 (S112), and then terminates the control.

As described above, the controller 40 carries out steps S101 to S110 (or S111 or S112), thereby terminating the series of control. Preferably, the controller 40 carries out steps S101 to S110 (or S111 or S112) repeatedly until the quantity of the water falls within the allowable range in step S104, the difference falls within the target range in step S105, and the opening degree of the water regulation valve is held in step S10. Alternatively, the controller 40 may hold the opening degree of the water regulation valve 11 in a proper state by repeatedly carrying out steps S101 to S110 (or S111 or S112) every predetermined time even after the quantity of the water falls within the allowable range in step S104, the difference falls within the target range in step S105, and the opening degree of the water regulation valve is held in step S110.

(4) Features (4-1)

The first embodiment provides a water regulator 10 for controlling a quantity of water flowing through water pipes of a water circuit 5 in a refrigeration cycle apparatus (1) including a refrigerant circuit (2) through which a refrigerant flows, a circulation pump (51) having a number of rotations controlled such that a difference between a pressure at an inlet of the circulation pump and a pressure at an outlet of the circulation pump falls within a predetermined range, the circulation pump being configured to circulate the water in the water pipes, and a heat exchanger (23) configured to cause the refrigerant flowing through the refrigerant circuit to exchange heat with the water flowing through the water pipes. The water regulator 10 includes: a water regulation valve 11 configured to regulate the quantity of the water flowing through the water pipes; a first temperature sensor 12 configured to measure a temperature of one of the water pipes which is connected to an inlet of the heat exchanger 23; a second temperature sensor 13 configured to measure a temperature of one of the water pipes which is connected to an outlet of the heat exchanger 23; and a controller 40 configured to control an opening degree of the water regulation valve 11, based on a difference between the temperature measured by the first temperature sensor 12 and the temperature measured by the second temperature sensor 13.

According to the first embodiment, the water regulation valve 11 of the water regulator 10 regulates the quantity of the water flowing through the water pipes of the water circuit 5. The water regulator 10 thus indirectly controls the number of rotations of the circulation pump 51 in accordance with a load to be applied to the refrigeration cycle apparatus 1. This configuration therefore improves the energy conservation of the entire apparatus.

In addition, the controller 40 of the water regulator 10 controls the opening degree of the water regulation valve 11 such that the difference between the temperature measured by the first temperature sensor 12 and the temperature measured by the second temperature sensor 13 falls within the predetermined range. This configuration therefore enables optimization of the quantity of the water circulating in the water circuit 5.

According to the first embodiment, the controller 40 controls the opening degree of the water regulation valve 11 during a normal operation such as the cooling operation or the heating operation. This configuration therefore enables optimization of the quantity of the water circulating in the water circuit 5 during the normal operation. In addition, this configuration enables optimization of the quantity of the water during the normal operation in such a manner that the control is performed repeatedly every predetermined time.

(4-2)

According to the first embodiment, the controller 40 of the water regulator 10 adjusts the opening degree of the water regulation valve 11 such that the quantity of the water flowing through the water pipes of the water circuit 5 falls within the predetermined range (S104). The quantity of the water is not actually measured, but is calculated by computation (S103).

According to the first embodiment, the water regulator 10 adjusts the opening degree of the water regulation valve 11, based on the quantity of the water calculated by computation, in addition to the difference between the temperature of the water pipe connected to the inlet of the heat source-side heat exchanger 23 and the temperature of the water pipe connected to the outlet of the heat source-side heat exchanger 23. The water regulator 10 therefore controls the quantity of the water more properly. Since the quantity of the water is calculated by computation, this configuration eliminates a necessity of an expensive water sensor.

(4-3)

The controller 40 calculates the quantity of the water in step S103, based on the refrigerant-side capacity of the refrigerant calculated in step S102.

In other words, the controller 40 calculates the quantity of the water depending on an amount of heat exchange in the refrigeration cycle apparatus 1, and controls the quantity of the water circulating in the water circuit 5, based on the quantity of the water thus calculated. This configuration therefore enables control on the quantity of the water more properly.

According to the first embodiment, the controller 40 calculates the refrigerant-side capacity of the refrigerant, based on the amount of the circulating refrigerant and the difference between the specific enthalpy of the refrigerant at the refrigerant inlet of the heat source-side heat exchanger 23 and the specific enthalpy of the refrigerant at the refrigerant outlet of the heat source-side heat exchanger 23 (see Equation (2)).

(4-4)

According to the first embodiment, the controller 40 of the water regulator 10 adjusts the opening degree of the water regulation valve 11 such that the quantity of the water flowing through the water pipes of the water circuit 5 falls within the predetermined range (S104), and then controls the opening degree of the water regulation valve 11, based on the difference between the temperature of the water pipe connected to the inlet of the heat source-side heat exchanger 23 and the temperature of the water pipe connected to the outlet of the heat source-side heat exchanger 23 (S105). This control thus optimizes the quantity of the water flowing through the water pipes of the water circuit 5.

(5) Modifications (5-1) Modification 1A

A water regulator 10 according to Modification 1A is equal in configuration to that according to the first embodiment. A method of opening degree control for a water regulation valve 11 according to Modification 1A is equal to that according to the first embodiment, except the method of calculating the amount of the circulating refrigerant in step S1023. A description will be given of a method of calculating an amount of a circulating refrigerant according to Modification 1A.

In Modification 1A, the controller 40 calculates the amount of the circulating refrigerant, using parameters including parameters indicating a state of an operation carried out by the refrigeration cycle apparatus 1 and parameters indicating characteristics of the compressor 21.

The controller 40 measures a refrigerant evaporation pressure and a refrigerant suction temperature in the compressor 21. The refrigerant evaporation pressure and the refrigerant suction temperature are the parameters indicating the state of the operation carried out by the refrigeration cycle apparatus 1. First, the controller 40 calculates a refrigerant suction density ($kg/m^3$) from the refrigerant evaporation pressure and the refrigerant suction temperature. Next, the controller 40 calculates an amount of the circulating refrigerant [kg/s] from Equation (4), using a volumetric efficiency [%], a piston displacement [$m^3$/rev], and a current number of rotations of the compressor 21 [rps]. The volumetric efficiency [%] and the piston displacement [$m^3$/rev] are parameters indicating the characteristics of the compressor 21.

$$(\text{amount of circulating refrigerant } 1\ kg/s) = (\text{volumetric efficiency \%}) \times (\text{piston displacement } [m^3/rev]) \times (\text{number of rotations of compressor } [rps]) \qquad (4)$$

While various embodiments of the present disclosure have been described herein above, it is to be appreciated that various changes in form and detail may be made without departing from the spirit and scope of the present disclosure presently or hereafter claimed.

REFERENCE SIGNS LIST

1: refrigeration cycle apparatus
2: refrigerant circuit
5: water circuit
10: water regulator
11: water regulation valve
12: first temperature sensor
13: second temperature sensor
20: heat source unit
23: heat source-side heat exchanger
30a, 30b: utilization unit
40: controller
51: circulation pump

CITATION LIST

Patent Literature

Patent Literature 1: JP 2008-075948 A

The invention claimed is:

1. A water regulator for controlling a quantity of water flowing through water pipes in a refrigeration cycle apparatus including a refrigerant circuit through which a refrigerant flows, a circulation pump having a number of rotations controlled such that a difference between a pressure at an inlet of the circulation pump and a pressure at an outlet of the circulation pump falls within a predetermined range, the circulation pump being configured to circulate the water in the water pipes, and a heat exchanger configured to cause the refrigerant flowing through the refrigerant circuit to exchange heat with the water flowing through the water pipes, the water regulator comprising:
a water regulation valve configured to regulate the quantity of the water flowing through the water pipes;
a first temperature sensor configured to measure a temperature of one of the water pipes which is connected to an inlet of the heat exchanger;
a second temperature sensor configured to measure a temperature of one of the water pipes which is connected to an outlet of the heat exchanger; and
a controller configured to control an opening degree of the water regulation valve, based on a difference between the temperature measured by the first temperature sensor and the temperature measured by the second temperature sensor, wherein
a number of rotations of the circulation pump is controlled independently from the controller, and
the controller adjusts the opening degree of the water regulation valve to change the quantity of the water flowing through the water pipes and then adjusts the opening degree to change a difference between a pressure at an inlet of the circulation pump and a pressure at an outlet of the circulation pump, such that a number of rotations of the circulation pump changes.

2. The water regulator according to claim 1, wherein the controller controls the opening degree of the water regulation valve such that the difference between the temperature measured by the first temperature sensor and the temperature measured by the second temperature sensor falls within a predetermined range.

3. The water regulator according to claim 1, wherein the controller adjusts the opening degree of the water regulation valve such that the quantity of the water flowing through the water pipes falls within a predetermined range.

4. The water regulator according to claim 3, wherein the controller calculates the quantity of the water, based on a refrigerant-side capacity of the refrigerant.

5. The water regulator according to claim 4, wherein the controller calculates the refrigerant-side capacity of the refrigerant, based on an amount of the circulating refrigerant and a change between the enthalpy of the refrigerant at the inlet of the heat exchanger and the enthalpy of the refrigerant at the outlet of the heat exchanger.

6. The water regulator according to claim 3, wherein the controller adjusts the opening degree of the water regulation valve such that the quantity of the water flowing through the water pipes falls within the predetermined range, and then controls the opening degree of the water regulation valve, based on the difference between the temperature measured by the first temperature sensor and the temperature measured by the second temperature sensor.

7. The water regulator according to claim 1, wherein the heat exchanger serves as an evaporator during a heating operation and as a condenser during a cooling operation for the refrigeration cycle apparatus, and
the controller and the heat exchanger are disposed in a heat source unit of the refrigeration cycle apparatus.

8. A water regulating system comprising:
water circuit including a circulation pump having a number of rotations controlled such that a difference between a pressure at an inlet of the circulation pump and a pressure at an outlet of the circulation pump falls within a predetermined range, the circulation pump being configured to circulate the water in the water pipes,
a refrigeration cycle apparatus including a refrigerant circuit and a heat exchanger configured to cause the refrigerant circuit to exchange heat with the water flowing through the water circuit; and
a water regulator for controlling a quantity of water flowing through water pipes, the water regulator including:
a water regulation valve configured to regulate the quantity of the water flowing through the water pipes;
a first temperature sensor configured to measure a temperature of one of the water pipes which is connected to an inlet of the heat exchanger;
a second temperature sensor configured to measure a temperature of one of the water pipes which is connected to an outlet of the heat exchanger; and
a controller configured to control an opening degree of the water regulation valve, based on a difference between the temperature measured by the first temperature sensor and the temperature measured by the second temperature sensor, wherein
a number of rotations of the circulation pump is controlled independently from the controller, and
the controller adjusts the opening degree of the water regulation valve to change the quantity of the water flowing through the water pipes and then adjusts the opening degree to change a difference between a pressure at an inlet of the circulation pump and a pressure at an outlet of the circulation pump, such that a number of rotations of the circulation pump changes.

9. The water regulator according to claim 2, wherein the controller adjusts the opening degree of the water regulation valve such that the quantity of the water flowing through the water pipes falls within a predetermined range.

10. The water regulator according to claim 4, wherein the controller adjusts the opening degree of the water regulation valve such that the quantity of the water flowing through the water pipes falls within the predetermined range, and then controls the opening degree of the water regulation valve, based on the difference between the temperature measured by the first temperature sensor and the temperature measured by the second temperature sensor.

11. The water regulator according to claim 5, wherein the controller adjusts the opening degree of the water regulation valve such that the quantity of the water flowing through the water pipes falls within the predetermined range, and then controls the opening degree of the water regulation valve, based on the difference between the temperature measured by the first temperature sensor and the temperature measured by the second temperature sensor.

12. The water regulator according to claim 2, wherein the heat exchanger serves as an evaporator during a heating operation and as a condenser during a cooling operation for the refrigeration cycle apparatus, and
the controller and the heat exchanger are disposed in a heat source unit of the refrigeration cycle apparatus.

13. The water regulator according to claim 3, wherein the heat exchanger serves as an evaporator during a heating operation and as a condenser during a cooling operation for the refrigeration cycle apparatus, and
the controller and the heat exchanger are disposed in a heat source unit of the refrigeration cycle apparatus.

14. The water regulator according to claim 4, wherein
the heat exchanger serves as an evaporator during a heating operation and as a condenser during a cooling operation for the refrigeration cycle apparatus, and
the controller and the heat exchanger are disposed in a heat source unit of the refrigeration cycle apparatus.

15. The water regulator according to claim 5, wherein
the heat exchanger serves as an evaporator during a heating operation and as a condenser during a cooling operation for the refrigeration cycle apparatus, and
the controller and the heat exchanger are disposed in a heat source unit of the refrigeration cycle apparatus.

16. The water regulator according to claim 6, wherein
the heat exchanger serves as an evaporator during a heating operation and as a condenser during a cooling operation for the refrigeration cycle apparatus, and
the controller and the heat exchanger are disposed in a heat source unit of the refrigeration cycle apparatus.

\* \* \* \* \*